United States Patent
Fukushima

[11] 3,722,926
[45] Mar. 27, 1973

[54] LIQUID COUPLING

[76] Inventor: Rinjiro Fukushima, No. 1-090, Toyoda, Hino-shi, Tokyo, Japan

[22] Filed: July 12, 1971

[21] Appl. No.: 161,491

[30] Foreign Application Priority Data

July 13, 1970 Japan..................................45/61259

[52] U.S. Cl..............285/261, 285/275, 285/DIG. 1
[51] Int. Cl...............................................F16l 27/06
[58] Field of Search...285/95, 261, DIG. 1, 275, 278, 285/272

[56] References Cited

UNITED STATES PATENTS

| | | | |
|---|---|---|---|
| 3,334,926 | 8/1967 | Faccou | 285/261 X |
| 2,511,495 | 6/1950 | Crot | 285/261 X |
| 2,414,509 | 1/1947 | Crot | 285/261 X |
| 1,985,012 | 12/1934 | Boehm | 285/95 X |

FOREIGN PATENTS OR APPLICATIONS 637,319    3/1962    Italy ........................................285/261

Primary Examiner—Thomas F. Callaghan
Attorney—Jay M. Cantor

[57]          ABSTRACT

The disclosure relates to a liquid coupling for connecting a path between a casing and a rotor within the casing, the path being around the rotor and then normal to the axis of the rotor to the rotor center where it communicates with an outlet passage to decrease rotor wear due to abrasion thereof with the casing.

2 Claims, 3 Drawing Figures

Patented March 27, 1973      3,722,926

LIQUID COUPLING

This invention relates to a liquid coupling which freely connects a path between a casing and a rotor on a surface level formed at right angles to the rotor core and shaft axis of the rotor which abradantly revolves inside the casing, even liquid pressure being maintained on the abradantly revolving surface of rotor.

Generally marketed liquid coupling devices of the prior art are formed by a casing A and rotor B (FIG. 3) abradantly revolving in the casing interior and having linear open connection between passages C and D of casing A and rotor B. Consequently, liquid pressure caused by liquid flowing from open section E to abrasively revolving surface F of rotor B squeezes rotor B against abrasion surface G of confronting casing A. In such prior art devices, the rotor B wears away and causes liquid leaks. In accordance with the present invention these defects of the prior art are eliminated, turning of the rotor being smooth, leakage being prevented and long ideal operation being achieved.

It is therefore an object of this invention to provide a liquid coupling between a casing and a rotor which minimizes wear of the elements.

It is a further object of this invention to provide a liquid coupling between a casing and a rotor which operates smoothly, has minimal leakage and is reliable It is a yet further object of this invention to provide a liquid coupling between a casing and a rotor therein wherein the path of liquid travel is around the outer surface of the rotor and then normal to the rotor axis.

The above objects and still further objects of the invention will immediately become apparent to those skilled in the art after consideration of the following preferred embodiment thereof, which is provided by way of example and not by way of limitation, wherein.

Figure 1:
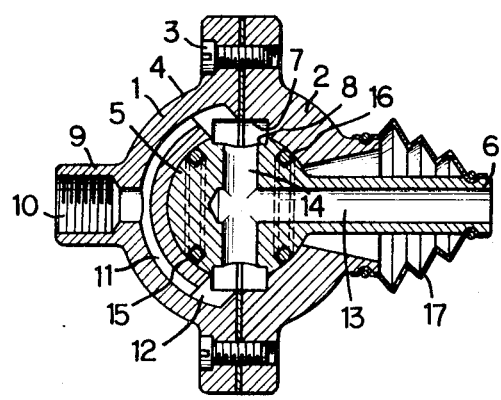
FIG. 1 is a cross section of a preferred embodiment of the present invention.
Figure 2:
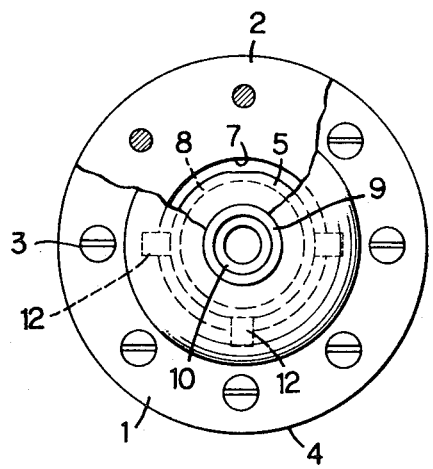
FIG. 2 is a left side view of FIG. 1, partially in cross section.
Figure 3:
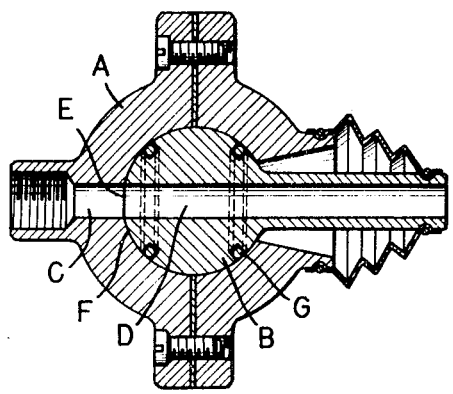
FIG. 3 is a side view of a prior art liquid coupling.

Referring now to FIGS. 1 and 2, main body 1 and cover 2 are fixed by bolts 3 to form casing 4 in which ring passages 7 and 8 are established between rotor 5 and casing 4 placed in left and right surface levels and formed at right angles to the core of rotor 5 and the axis of shaft 6 of the rotor 5 which abradantly revolves within casing 4. Ring passage 7 of casing 4 and main passage 10 of conduit tube setting section 9 of casing 4 are connected by subsidiary passages 11 and 12. Ring passage 8 of rotor 5 and main passage 13 of shaft 6 are connected by subsidiary route 14. "O" rings are shown as 15 and 16. Bellows 17 is formed from shrinkable leather and is a dust cover made from rubber sheet.

The ring passages 7 and 8 are grooved both on casing 4 and rotor 5. A single furrow on either section can be sufficient with another subsidiary passage directly open-connected to the ring passages.

In this invention, liquid flow originates from main passage 10, passes through subordinate routes 11 and 12 to flow into ring passages 7 and 8 and passes through subordinate route 14 to flow into main passage 13 to reach the conduit pipe set on shaft 6. Liquid flowing into ring passages 7 and 8 surrounds the abradantly revolving surface between rotor 5 and casing 4 and travels in passages 7 and 8, at right angles to the core of rotor 5 and the axis of shaft 6. Surrounding pressures around rotor 5 are evenly maintained so rotor 5 is not squeezed against casing 4, resulting in smooth turning of rotor 5. In addition friction of revolving surfaces is prevented, leakage does not occur and long operation in good condition is attained.

Though the invention has been described with respect to a specific preferred embodiment thereof, many variations and modifications will immediately become apparent to those skilled in the art. It is therefore the intention that the appended claims be interpreted as broadly as possible to include all such variations and modifications.

What is claimed is:

1. A fluid conducting ball joint comprising, a casing formed of a pair of annular casing half-sections having confronting semi-spherical cavities of equal dimensions therein and secured together to form an enclosed substantially spherical bearing, each half-section having a radial end face, means for securing said end faces in sealing engagement with each other, a spherical member snugly mounted within the spherical bearing for rotation therein, a portion of the wall adjacent said end face of the semispherical cavity in each section being recessed to form between them a ring-like channel surrounding the spherical member, the spherical member being provided in its outer surface with a circumferential channel registerable with the ring-like channel, seal means disposed on opposite sides of said ring-like channel to provide a fluid-tight seal between the casing and the spherical member, a diametrically extending fluid passageway in the the spherical member opening at both ends into the circumferential channel, one of the casing sections having an inlet port through its outer periphery and a plurality of passageways within the material thereof leading from the port into the ring-like channel, the inner surface of said one casing section having a continuous spherically concave surface disposed inwardly from said recess in said one section, the radially inner end of said spherical member having a continuous spherically convex surface in complete bearing relationship with said spherically concave surface, the spherical member having a bore extending radially from the passageway therein, and a conduit integrally secured to the spherical member extending from the radial bore through an opening in the other casing section which is diametricall opposite the inlet port, to allow limited swinging movements of the conduit.

2. A fluid conducting ball joint according to claim 1 including a yieldable cover member about the opening in the other casing section and secured to the conduit and wherein surrounding pressures on said spherical member and said bearing are evenly maintained thereby avoiding undue wear on the joint.

* * * * *